United States Patent [19]

Kamaya

[11] Patent Number: 4,770,329
[45] Date of Patent: Sep. 13, 1988

[54] ROOF CARRIER WITH LOCKING DEVICE

[75] Inventor: Masashi Kamaya, Tokyo, Japan

[73] Assignee: Piaa Corporation, Tokyo, Japan

[21] Appl. No.: 921,440

[22] Filed: Oct. 22, 1986

[51] Int. Cl.⁴ .............................................. B60R 9/04
[52] U.S. Cl. ..................................... 224/315; 224/331
[58] Field of Search .............. 224/331, 329, 325, 309, 224/324, 315, 322; 70/167, 258, DIG. 57

[56] References Cited

U.S. PATENT DOCUMENTS

| | | | |
|---|---|---|---|
| 2,367,127 | 1/1945 | Johansson | 70/DIG. 57 X |
| 3,525,461 | 8/1970 | Bronson | 224/315 |
| 4,401,247 | 8/1983 | Zoor | 224/331 X |
| 4,441,344 | 4/1984 | Kurpershoek | 70/258 X |
| 4,584,856 | 4/1986 | Petersporff et al. | 70/DIG. 57 X |
| 4,640,450 | 2/1987 | Gallion et al. | 224/331 |

FOREIGN PATENT DOCUMENTS

| | | | |
|---|---|---|---|
| 2945950 | 5/1981 | Fed. Rep. of Germany | 224/315 |
| 2950449 | 6/1981 | Fed. Rep. of Germany | 224/315 |
| 3104163 | 9/1982 | Fed. Rep. of Germany | 224/315 |
| 3243878 | 5/1984 | Fed. Rep. of Germany | 224/315 |
| 2531668 | 2/1984 | France | 224/315 |
| 2122154 | 1/1984 | United Kingdom | 224/315 |

Primary Examiner—Henry J. Recla
Assistant Examiner—Robert M. Petrik
Attorney, Agent, or Firm—Oblon, Fisher, Spivak, McClelland & Maier

[57] ABSTRACT

A roof carrier including horizontal struts able to carry and fix in place baggage, a plurality of stands supporting the struts on an automobile, bolts provided in the stands for fixing the struts and stands in position, and a locking device covering the heads of the bolts provided detachably on the struts or stands.

2 Claims, 2 Drawing Sheets

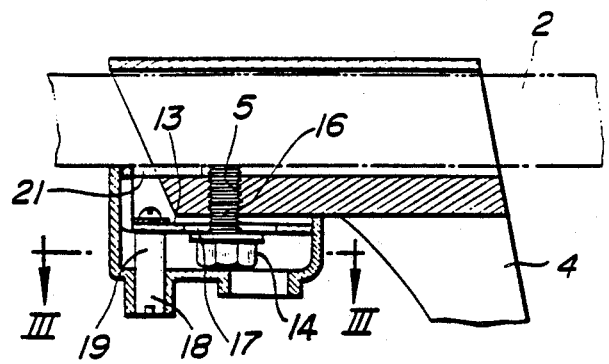
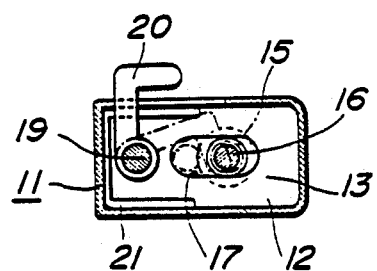
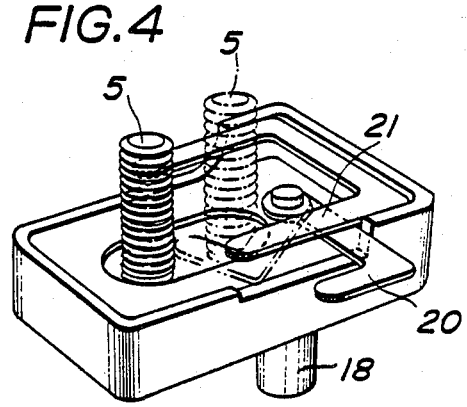

ROOF CARRIER WITH LOCKING DEVICE

BACKGROUND OF THE INVENTION

1. Field of the Invention

The present invention relates to a roof carrier for automobiles, more particularly to a roof carrier with a locking device for preventing theft of objects carried thereon.

2. Description of the Related Art

The limited storage space in automobile trunks have made roof carriers an absolute necessity for travel or when otherwise carrying large amounts of baggage or large sized objects. The consumer has come to prefer quality carriers and thus they have come to have a high value in themselves. On the other hand, ease of attachment and detachment is a major sales point of roof carriers. This, however, leads to the real danger of theft.

SUMMARY OF THE INVENTION

The present invention has as its object the provision of a locking device which can be easily attached or detached and which effectively prevents theft of the roof carrier.

The roof carrier consists of horizontal struts able to carry and fix into place baggage or other objects to be transported and a plurality of stands which support and affix these horizontal struts to the automobile. The means for fixing the struts and stands in place are usually bolts provided in the stands. Provision of a locking device which covers the heads of the bolts and yet can be easily attached to or detached from the struts or stands prevents a potential thief from discerning the bolts, since the bolt heads are hidden from exposure outside, and enables only a person with the key from removing the roof carrier.

BRIEF DESCRIPTION OF THE DRAWINGS

The features and advantages of the present invention will be clearly appreciated from the foregoing description and drawings in which the same reference numerals designate the corresponding elements and in which:

FIG. 2 is a cross-sectional view of the locking device;

FIG. 3 is a cross-sectional view of the locking device of FIG. 2 taken along line III—III; and FIG. 4 is a perspective view of the locking device as seen from the top.

DESCRIPTION OF THE PREFERRED EMBODIMENTS

Figure 1:
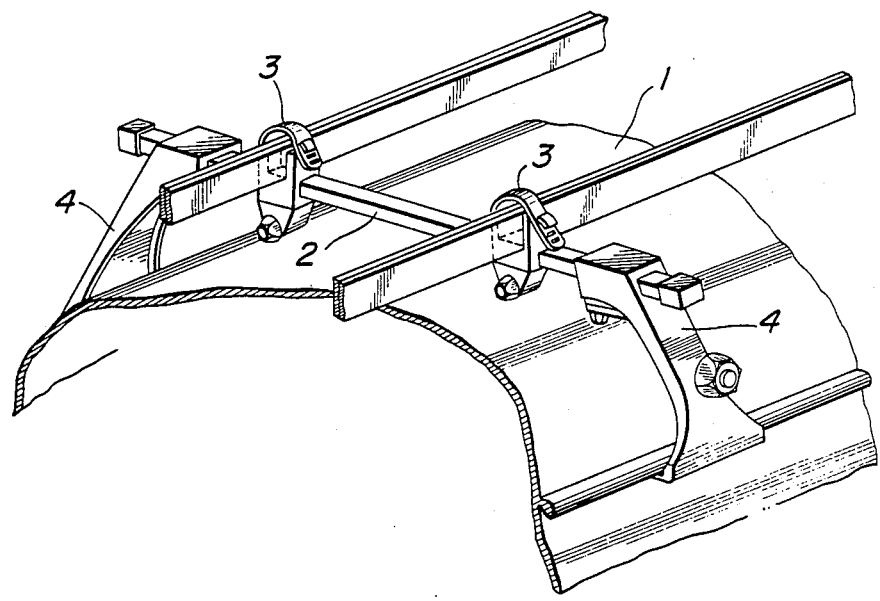
FIG. 1 is a view of the state of use of the roof carrier of the embodiment of the present invention.

An embodiment of the present invention will be described below in detail.

FIG. 1 is a general view showing a roof carrier attached to an automobile, i.e., the state of use of the embodiment of the present invention. In the figure, reference numeral 1 is the roof of the automobile, and 2 is one of a number of horizontal struts provided in the widthwise direction of the automobile. The horizontal struts 2 are provided with a plurality of supports 3 which fix in position skis or other objects to be carried.

Reference numerals 4 are stands in which the two end portions of each of the horizontal struts 2 are inserted and which support the struts 2 above the roof of the automobile. As means for fixing the stands 4 and horizontal struts 2 in place, as shown in FIG. 2 and on, use is generally made of bolts 5 screwed into the stands 4, the ends of which are tightened against the horizontal struts 2.

Reference numeral 11 is a locking device. The locking device 11 has an elongated box shaped cover 12 and an intermediate wall 13 provided in the middle of the cover 12. The intermediate wall 13 is provided, in one direction with an aperture 5 enabling insertion of the head 14 of a bolt 5 and a small aperture 17, connected to the same, enabling engagement of the shaft portion 16 of the bolt 5 when the cover 12 is slid to the side. On the opposite side of the apertures 15 and 17 is provided a usual lock 18. The lock 18 is provided on its shaft with a hook shaped rotatable piece 20. The rotatable piece 20 is designed so that, when turned (i.e., during locking), the hook portion engages with the shaft portion 16 of the bolt 5 from the outside direction. Further, in the figures, reference numeral 21 is a horizontal, U-shaped mounting piece. This may be mounted at any portion of the locking device 11. As in this embodiment, it may be comprised as a horizontal, U-shaped piece extending over the intermediate wall 13 at the top of the locking device.

To lock a horizontal strut 2 and stand 4 using this locking device 11, first the U-shaped mounting piece 21 is inserted between the horizontal strut 2 and stand 4. In this case, enough clearance for insertion of the mounting piece 21 between the horizontal strut 2 and stand 4 is required. Therefore, though not illustrated in the figures, an appropriate intermediate object may be emplaced, in a manner not obstructing the insertion of the mounting piece 21. Next, at the same time as the insertion, the head portion 14 of the bolt 5 affixing the horizontal strut 2 and the stand 4 is passed through the aperture 15 of the intermediate wall 13. The locking device 11 is then slid into place so as to position the shaft portion 16 of the bolt 5 at the small aperture 17 of the intermediate wall 13. Therefore, when the bolt 5 is screwed and tightened in the stand 4, it is necessary to provide a small clearance between the head portion 14 of the bolt and the base surface of the stand 4. In this state, the locking device 11 is fixed and supported so that it will not fall off due to the engagement of the mounting piece 21, the bolt head portion 14, and the intermediate wall 13. Now, when the lock 18 is turned by a key (not illustrated), the rotatable piece 20 provided on the shaft 19 of the lock 18 is moved and the hook portion is engaged with the shaft portion 16 of the bolt 5. This engagement cannot be released without a second operation of the lock 18, i.e., other than by a person holding the key. This effectively eliminates the danger of theft.

In this way, the present invention provides a locking device which can easily affix horizontal struts and stands by usual bolts and, at the same time, covers the bolts and which can only be operated by a person having its key. The locking device can further be attached and detached simply by inserting it between the horizontal struts and stands.

What is claimed is:

1. A roof carrier comprising:
   at least one horizontal strut for carrying and fixing in place baggage;
   a plurality of stands for supporting said at least one strut on an automobile;
   means connected to said plurality of stands for fixing said at least one horizontal strut in place;

a locking device covering said means for fixing said at least one strut in place, wherein said means for fixing said at least one strut in place comprises a headed bolt interconnecting at least one of said plurality of stands and said at least one horizontal strut, said bolt having a shaft portion; a cover member engaged with at least one of said plurality of stands so as to cover said bolt; and a hook-shaped member pivotably mounted on a casing for engagement with said shaft portion of said bolt so as to fix said locking device and; an intermediate wall member having an aperture formed therein and positioned within said casing, and having said hook-shaped member connected thereto, wherein said bolt is mounted in said aperture in said intermediate wall member.

2. A roof carrier as set forth in claim 1, which further comprises a U-shaped mounted piece mounted on said locking device for fixing said locking device in position and which is spaced from said intermediate wall member.

* * * * *